Patented Nov. 18, 1947

2,430,911

UNITED STATES PATENT OFFICE 2,430,911

ALKOXYMETHYL DERIVATIVES OF CELLULOSE AND PROCESS

William Hale Church, Buffalo, N. Y., and Francis B. Cramer, Waynesboro, Va., assignors to E. I. du Pont de Nemours & Company, Wilmington, Del., a corporation of Delaware No Drawing. Application November 17, 1943, Serial No. 510,656

7 Claims. (Cl. 260—226)

This invention relates to the preparation of organic solvent-soluble organic derivatives of cellulose, such as cellulose acetate, containing the group —O—CH$_2$—O-alkyl. More particularly, this invention relates to organic solvent-soluble organic derivatives of cellulose, such as cellulose acetate, containing the group

—O—CH$_2$—O—CH$_3$, and to the process for preparing the same.

It is known to introduce alkoxymethyl groups into nitrogen-containing compounds such as polyamides, melamine, protein, urea, etc., by merely reacting the compound with formaldehyde and an alcohol in the presence of an inorganic acid such as phosphoric acid, or a carboxylic acid such as oxalic or acetic acid as catalyst. Because of the obvious simplicity of the reaction involved and the relative cheapness of the alkoxymethyl-forming reactants, it has been proposed to prepare alkoxymethyl ethers of organic solvent-soluble organic derivatives of cellulose, e. g. cellulose acetate, in the same fashion. However, the successful execution of this proposal has not heretofore been realized for the reason that the acid catalysts known to promote the reaction with nitrogen-containing substances are either wholly ineffective with cellulose derivatives, or their use is attended with disadvantages which preclude commercial exploitation of the reaction. For example, formic acid, favored as a catalyst in the reaction of formaldehyde and alcohol with polyamides is completely inoperative with cellulose derivatives. Oxalic and acetic acids are likewise inoperative and phosphoric acid is inoperative at temperatures below about 80° C. Sulfuric acid tends to the formation of useless insoluble products, and the reaction is difficult to control.

An object of this invention, therefore, is to prepare, by a simple economical process, organic solvent-soluble organic derivatives of cellulose containing the group —O—CH$_2$—O-alkyl, wherein the alkyl group contains less than 8 carbon atoms. A further object is to prepare organic solvent-soluble organic derivatives of cellulose, such as cellulose acetate, containing the group —O—CH$_2$—O-alkyl by the interaction of cellulose derivative, formaldehyde and a monohydric aliphatic alcohol. A still further object is to prepare organic solvent-soluble organic derivatives of cellulose containing the group

—O—CH$_2$—O—CH$_3$.

Another object is to prepare the methoxymethyl ether of cellulose acetate. These and other objects will more clearly appear hereinafter.

We have found that organic derivatives of cellulose containing at least one free hydroxyl group in the molecule when dissolved in an inert organic solvent react with formaldehyde and lower aliphatic alcohols (i. e., alcohols containing less than 8 carbon atoms), in the presence of a sulfonic acid of an aromatic hydrocarbon as catalyst, to form the lower alkoxymethyl ethers of the cellulose derivative. Accordingly, the above stated objects are realized by reacting the desired organic derivative of cellulose containing at least one free hydroxyl group in the molecule, dissolved in an inert organic solvent, with a formaldehyde-yielding compound and the desired lower alkoxy-imparting alcohol in the presence of a small amount of a sulfonic acid of an aromatic hydrocarbon, and isolating the resulting alkoxymethyl ether, as by precipitation in water.

As a matter of convenience and because alkoxymethyl ethers of cellulose acetate probably constitute the most valuable commercial product of the invention, the process of this invention will be further described in terms of the commercially available secondary or acetone-soluble cellulose acetate containing from 45% to 57% of combined acetic acid. It is to be understood, however, that secondary cellulose acetate is merely illustrative and that there may be used in its place any other cellulose acetate which is soluble in the reaction mixture and which contains a free hydroxyl group, or any other organic solvent-soluble cellulose organic derivative containing a free hydroxyl group such as cellulose propionate, cellulose butyrate, mixed cellulose esters, methyl cellulose, ethyl cellulose, benzyl cellulose, or mixed ethers or mixed ether-esters of cellulose.

The preferred lower aliphatic alcohol is methanol, but any reactive monohydric aliphatic alcohol containing less than 8 carbon atoms, such as ethanol, isopropanol, butyl alcohol, amyl alcohol, and hexanol, may be employed for the purposes of this invention. The methanol or equivalent alcohol should be present in sufficient quantity to assure the reaction's moving to an alkoxy derivative rather than a simple cross-linking by the formaldehyde. At least 0.84 per 1 part of cellulose ester assures this. It will be understood that quantities in excess of this may be used since the excess alcohol will serve as a solvent or as a diluent.

While paraformaldehyde is preferred, the reaction proceeds well with any anhydrous formaldehyde-yielding substance, among which may be mentioned trioxane, trioxymethylenes, and hexamethylene tetramine. The amount of paraformaldehyde is preferably of the order of 1.25 parts per 1 part of cellulose ester, although quantities varying from 0.35 to 1.50 parts have been found to give successful results. Other formaldehyde-yielding substances will, of course, be used in equivalent proportions.

The preferred catalyst is paratoluene sulfonic acid. Representative alternative aromatic sulfonic acids are benzine sulfonic acid, xylene sulfonic acid, and orthotoluene and metatoluene sulfonic acids. The quantities of the specific catalyst in terms of a 40% solution of paratoluene sulfonic acid shown in many of the examples hereinafter are about 0.1 part per 1 part of cellulose ester. This is a preferred amount but quantities varying between 0.025 to 0.125 are included. Those skilled in the art will understand the quantity to be chosen depends inter alia on the particular catalyst selected and the reaction temperature. It is required that sufficient catalyst be used to promote the reaction but too large an amount tends to force the reaction to a simple cross-linking by the formaldehyde with the cellulose without reacting the alcohol and with the formation of insoluble reaction products.

The reaction can be carried out at temperatures within the range of from about 10° to about 120° C. A temperature of about 50° C. is preferred.

As solvent for the reaction, dioxane or dioxolane have been found to be especially useful but other non-reactive solvents or latent solvents may be employed and these include esters, such as methyl acetate, ethyl acetate and butyl actetate; ethers, such as dimethyl dioxane and the methyl ether of Cellosolve; ether-esters, such as the methyl Cellosolve actate; ketones, such as acetone and methyl ethyl ketone; and chlorinated hydrocarbons, such as chloroform and tetrachlorethane. The invention depends in part on the cellulose acetate or other ester being in solution. The concentration of the solution may be varied as the examples well illustrate. Generally speaking, is is desired that the ratio of cellulose ester to combined solvent-diluent be within the limits 1:3 and 1:15.

The following examples are illustrative of several specific applications of the principles of this invention. Throughout the description parts are by weight unless otherwise indicated.

| Examples | I | II | III | IV | V | VI |
|---|---|---|---|---|---|---|
| Cellulose acetate (45% combined acetic acid) | 10 | 16.5 | 10 | [1]10 | 10.3 | 10.3 |
| Methanol | 23 | 17.8 | 23 | 13.8 | 8.7 | |
| Isopropanol | | | | | | 25.6 |
| Paraformaldehyde | 12.4 | 6.38 | 12.4 | 12.8 | 12.8 | 12.8 |
| 40% p-toluene sulfonic acid | 0.99 | 0.5 | 0.99 | 0.99 | 0.99 | 0.99 |
| Dioxane | 100.2 | 51.6 | | 117 | 123 | 90.2 |
| Dioxolane | | | 103 | | | |
| Temperature, °C | 50 | Room | 40 | 50 | 50 | 50 |
| Time, hours | 12 | 123 | 20 | 20 | 20 | 20 |
| Per cent methoxy groups | 2.88 | 0.84 | 1.95 | 1.48 | 2.94 | |
| Per cent isopropoxyl groups | | | | | | 1.78 |

[1] 54.5% combined acetic acid.

The cellulose acetate is swollen in dioxane or dioxolane and then added to the methanol containing the other reactants. In Examples I to III, half of the methanol is first added to the dioxane suspension to complete solution. In Example VI, the solid cellulose acetate is added to the other reactants.

The paraformaldehyde is first dissolved in methanol, with the aid of heat and a few drops of 50% caustic soda solution, and is then cooled and filtered.

The reaction is carried out for the time and at the temperature specified. The reaction product is precipitated by pouring the reaction mass into a large volume of cold water with vigorous agitation. The precipitated flake is separated, washed and digested for five minutes in very dilute ammonium hydroxide to remove any polymerized formaldehyde. The flake is again washed in hard water at room temperature and dried.

The compounds produced in accordance with this invention are characterized by the presence of an alkoxymethyl group wherein the alkoxy group contains less than 8 carbon atoms, such as a methoxymethyl group, substituted in place of a hydrogen of a free hydroxyl. The degree of substitution may vary from a relatively small amount to as much as 5% or more. Depending on the degree of substitution, the products are characterized by solubility in such commonly available solvents as dioxane, acetone, ethyl acetate and many other cellulose acetate solvents. The products, therefore, represent a soluble species of cellulose acetate and thus open up many important fields of use, such as coating, casting and spinning. In addition, these products are capable of melting without decomposition and hence can be melt-spun or cast and injection molded.

These compounds or formed structures made from them by the convenient solvent method can be easily rendered insoluble by exposure to heat and catalyst as is known for alkoxymethyl derivatives of amides. It is thus possible to produce by conventional procedures an insoluble variety of cellulose acetate, an objective of very long standing and a matter of great industrial importance.

It is possible, too, to remove the acetate groups from the products of this invention by saponification and there is produced an alkoxymethyl cellulose, such as a methoxymethyl cellulose. This compound is known in the art but when produced in accordance with this invention, it is a much more uniformly substituted product and superior for many purposes, among which may be mentioned those which require a dispersion in caustic soda. It is believed, in preparing the alkoxymethyl compounds, that since a number of the hydroxyl groups of cellulose were already substituted by the acetate groups, the entrance of the methoxymethyl group into the molecule occurred with much greater regularity and that when the acetate groups were removed, a more uniformly composed compound was available. More importantly, since the alkoxymethyl derivative was made in solution, it is believed that all the hydroxyl groups were available for reaction, whereas when the reaction is carried out in a heterogeneous system, only the hydroxyl groups on the surface of the crystalline masses can be involved in the reaction.

The methoxymethyl ethers of cellulose acetate of this invention have proved to be very valuable as an adhesive. They can be applied as a sheet, powder or solution between the surfaces to be joined or laminated and the whole structure subjected to heat and pressure. Alternatively, the bond may be rendered permanently solvent-resistant and durable by the use of an acid catalyst and/or heat as is known. The materials which can be so joined or laminated are of a wide variety and include such elements as plywood laminations, the lamination of regenerated cellulose film to itself or to paper or other materials, the lamination of cellulose acetate film to itself or to other materials, or as coatings for such things as textile fabrics, mechanical fabrics, photographic film, etc. When these compounds are used as an adhesive for bonding together materials which themselves contain an active hydrogen group, for example, cellulose, cellulose acetate, synthetic linear polyamides, etc., a chemical bond is formed by cross-linking in addition to the mechanical bond formed by the adhesive itself.

When the compounds are used as molding powders and insolubilized, formed products of great resistance to deformation with changes of humidity conditions are produced.

As many apparently widely different embodiments of this invention may be made without departing from the spirit and scope thereof, it is to be understood that we do not limit ourselves to the specific embodiments thereof except as defined in the appended claims.

We claim:

1. The process which comprises reacting an organic solvent-soluble organic derivative of cellulose having at least one free hydroxyl group in the molecule dissolved in an inert organic solvent with from 0.35 to 1.50 parts of paraformaldehyde per part of organic derivative of cellulose and at least 0.84 part of methanol per part of the organic derivative of cellulose, in the presence of from 0.025 to 0.125 part of a 40% solution in methanol of paratoluene sulfonic acid per part of organic derivative of cellulose and at a temperature within the range of from about 10° C. to about 120° C., whereby to form an organic solvent-soluble organic derivative of cellulose containing the group —O—CH₂—O—CH₃.

2. The process which comprises reacting an organic solvent-soluble organic derivative of cellulose having at least one free hydroxyl group in the molecule dissolved in an inert organic solvent with 1.25 parts of paraformaldehyde per part of organic derivative of cellulose and at least 0.84 part of methanol per part of the organic derivative of cellulose, in the presence of 0.1 part of a 40% solution in methanol of paratoluene sulfonic acid per part of organic derivative of cellulose and at a temperature of about 50° C., whereby to form an organic solvent-soluble organic derivative of cellulose containing the group

—O—CH₂—O—CH₃

3. The process according to claim 2 wherein the organic derivative of cellulose is cellulose acetate.

4. The process according to claim 2 wherein the organic derivative of cellulose is cellulose acetate containing from about 45% to 57% of combined acetic acid.

5. As a new compound an organic solvent-soluble mixed cellulose acetate-ether containing as the ether substituent the group —O—CH₂—O-alkyl wherein the alkyl group contains less than 8 carbon atoms.

6. As a new compound an organic solvent-soluble mixed cellulose acetate-ether containing as the ether substituent the group

—O—CH₂—O—CH₃

7. The process which comprises reacting an organic solvent-soluble organic derivative of cellulose containing at least one hydroxyl group in the molecule with a formaldehyde-yielding compound and at least 0.84 part of a monohydric aliphatic alcohol of the formula alkyl-OH, wherein the alkyl group contains less than 8 carbon atoms, per part of the organic derivative of cellulose, in the presence of a catalyst consisting of a sulfonic acid of an aromatic hydrocarbon in an amount equivalent to from 0.025 to 0.125 part of a 40% solution in methanol of paratoluene sulfonic acid, whereby to form an organic solvent soluble organic derivative of cellulose containing the group —O—CH₂—O-alkyl.

WILLIAM HALE CHARCH.
FRANCIS B. CRAMER.

REFERENCES CITED

The following references are of record in the file of this patent:

UNITED STATES PATENTS

| Number | Name | Date |
|---|---|---|
| 2,190,451 | Haskins | Feb. 13, 1940 |
| 2,084,125 | Bock et al. | June 15, 1937 |
| 2,083,554 | Bock et al. | June 15, 1937 |